United States Patent [19]
Weiss

[11] Patent Number: 5,274,672
[45] Date of Patent: Dec. 28, 1993

[54] OPTIMIZED CLOCK RECOVERY FOR AN MSK SYSTEM

[75] Inventor: Karl R. Weiss, Plantation, Fla.

[73] Assignee: Motorola, Inc., Schaumburg, Ill.

[21] Appl. No.: 785,963

[22] Filed: Oct. 31, 1991

[51] Int. Cl.$^5$ .............................................. H04L 27/10
[52] U.S. Cl. ........................................ 375/47; 375/64; 375/90
[58] Field of Search ................. 375/47, 64, 90, 106, 375/113, 84; 332/100; 329/300; 455/218, 222

[56] References Cited

U.S. PATENT DOCUMENTS

| | | | |
|---|---|---|---|
| 3,702,379 | 11/1972 | Peterson et al. | |
| 3,993,868 | 11/1976 | Balcewicz | 375/47 |
| 4,028,490 | 6/1977 | Epstein | 375/90 |
| 4,324,001 | 4/1982 | Rhodes | 375/47 |
| 4,414,675 | 11/1983 | Comroe | 375/90 |
| 4,539,524 | 9/1985 | Goode | 329/50 |
| 4,541,118 | 9/1985 | Eastmond et al. | 455/35 |
| 4,669,095 | 5/1987 | Hall | 375/90 |
| 4,675,880 | 6/1987 | Davarian | 375/54 |
| 4,683,445 | 7/1987 | Erickson | 331/25 |
| 4,910,467 | 3/1990 | Leitch | 329/306 |
| 4,942,592 | 7/1990 | Leitch | 375/90 |

Primary Examiner—Curtis Kuntz
Assistant Examiner—T. Ghebretinsae
Attorney, Agent, or Firm—Juliana Agon

[57] ABSTRACT

A clock recovery system for radio communication inserts a synchronization signal (102) at a frequency of ½ the baud rate, at the spectral null of an MSK data signal (108), which is also at ½ the baud rate, for later retrieval. Hence, in a transmitter-encoder (100), an MSK generator (106) generates an MSK digitally modulated data signal (108e) having a baud rate and a spectral null at ½ the baud rate. A synchronization clock generator (104) generates a synchronization signal (102e) having a frequency at ½ the baud rate. This frequency at ½ the baud rate corresponds to the spectral null of the MSK digitally modulated data signal (108e). A transmitter transmits the synchronization signal (102e), at the spectral null of the data signal (108e), together (112) with the MSK digitally modulated data signal (108e). On the other end, a receiver-decoder (200) recovers (214) the synchronization signal (102d) and demodulates (212) the MSK digitally modulated data signal (108d) as a function of the synchronization signal (102d).

10 Claims, 3 Drawing Sheets

OPTIMIZED CLOCK RECOVERY FOR AN MSK SYSTEM

TECHNICAL FIELD

This invention relates generally to synchronization methods and apparatuses and more particularly to an improved method and arrangement for providing a synchronization signal to a minimum shift key (MSK) demodulator that may be advantageously utilized in data communications systems.

BACKGROUND

One problem that needs to be overcome in any digital data system is how to synchronize the timing reference of the receiver with the timing reference of the incoming data. Hence, in such a system it is desirable to provide a bit sync signal with the synchronous digital information to be used in decoding the transmitted digital information. Generally, a bit sync signal is usually provided by a predetermined number of preamble bits in a form of a preamble word which precedes a digital message. The preamble word is usually an alternating one and zero pattern to synchronize the internal clock of the receiver to that of the received signal, as quickly as possible.

The data information for radio transmission and reception is encoded. Thus, the encoded information can be of the type of scrambled speech, digital data, or any other form of data transfer. A type of frequency-shift keying (FSK) commonly referred to as minimum-shift keying (MSK) is particularly well suited for use in radio communications systems since the spectral energy is more easily contained within the limited bandwidth available than other binary frequency or phase-shift-keying modulations.

MSK modulation encodes the data bits as frequency shifts of the signal at time intervals equal to 1/(baud rate) where the baud rate is the transmission speed. The start of each new modulated bit is referred to as a bit boundary. An MSK signal is a continuous-phase-frequency-shift-keying (CPFSK). This implies that the phase of an MSK signal is continuous across the bit boundaries. For example, a mark or binary one may be characterized by modulation with a 1200 Hz signalling tone, and a space or binary zero may be characterized by modulation with an 1800 Hz signalling tone. The continuous phase in CPFSK indicates that the phase at frequency changes between the two signalling tones is continuous, i.e., a signalling tone begins at the same phase that the previous signalling tone ended with. In the preferred embodiment of the instant invention, the modulation technique is comprised of minimum shift keying (MSK) of digital data.

Also, to be MSK, the deviation ratio of the CPFSK must be equal to one-half. The deviation ratio is the frequency difference between the two signalling tones divided by the rate of transmission of the bits expressed in bits per second. In the above example of CPFSK with signalling tones of 1200 HZ and 1800 Hz, the transmission speed would be 1200 bits per second to be MSK. The MSK encoding scheme then sends out data at this constant rate, or transmission speed, which is referred to as the baud rate.

On the other end, an MSK decoder or demodulator will attempt to recover the data information from the transmitted signal. For data recovery, the decoder needs to synchronize to the transmitted data signal. This implies some kind of clock recovery scheme or mechanism in the decoder.

The clock recovery portion may be a phase-lock-loop which is synchronized to the bit transitions or boundaries of the preamble word previously mentioned. The demodulator is thus provided with an internal clock in the form of a phase-lock-loop that is based on a frequency which is a multiple of the expected preamble or incoming bit stream and is thus phase-locked to the incoming data for subsequent decoding or detecting.

Thus, the conventional demodulator consists of two parts: a device which extracts the bit clock, and a detector which recovers the original transmitted data.

An MSK demodulator can be built with varying amounts of hardware. As the knowledge of the synchronization clock of the transmitted signal becomes more exact, the reliability of the signal detection increases. Thus, better reliability in detection results in better performance, especially in poor signal to noise environments. Typically, the more reliable the demodulator becomes, the more hardware or complexity is required. However, the faster the transmission rate, or the more complex the demodulator, the higher the cost of implementation.

For example, in the microprocessor-based MSK demodulator such as described in U.S. Pat. No. 4,669,095, assigned to the assignee of the present invention, which is hereby incorporated by reference, a large portion of the processor time is used just in trying to derive a synchronization signal to recover the transmitter time base clock. Accordingly, there exists a need to conserve processor steps, or in other ways to simplify the demodulator while providing reliable signal detection.

SUMMARY OF THE INVENTION

Briefly, according to the invention, a clock recovery system for radio communication comprises inserting a synchronization signal at the frequency of $\frac{1}{2}$ the baud rate, at the spectral null of an MSK data signal, which is also at $\frac{1}{2}$ the baud rate, for later retrieval. Hence, in a transmitter-encoder, an MSK generator generates an MSK digitally modulated data signal having a particular baud rate and a spectral null at $\frac{1}{2}$ the baud rate. A synchronization clock generator generates a synchronization signal having a frequency at $\frac{1}{2}$ the baud rate. This frequency at $\frac{1}{2}$ the baud rate corresponds to the spectral null of the MSK digitally modulated data signal. A transmitter transmits the synchronization signal, at the spectral null of the data signal, together with the MSK digitally modulated data signal. On the other end, a receiver-decoder recovers the synchronization signal and demodulates the MSK digitally modulated data signal as a function of the synchronization signal.

DETAILED DESCRIPTION OF THE PREFERRED EMBODIMENT

Figure 1:
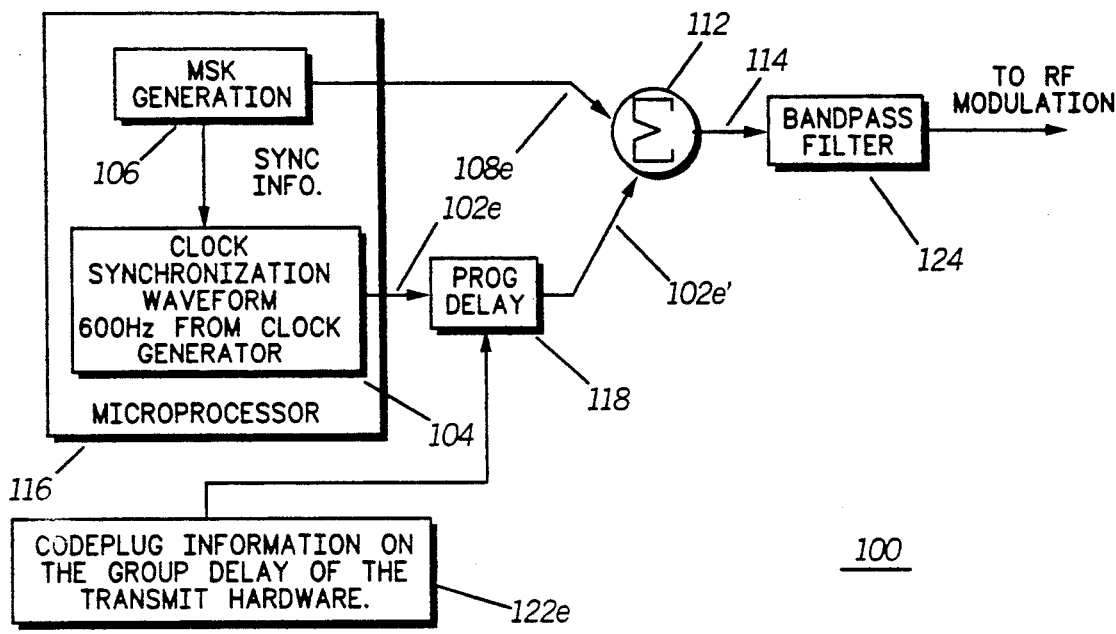
FIG. 1 is a block diagram of a transmitter-encoder in accordance with the present invention.

Referring to FIG. 1, a transmitter-encoder 100 of a base station, a portable, a mobile, or a fixed location radio is illustrated. A synchronization signal 102e generated by a clock generator 104 and synchronized by an MSK encoder or generator 106 is added to an MSK modulated data signal 108e at a summer 112 to obtain a combined MSK data signal and synchronization signal 114. The frequency of the synchronization signal, which in this case is 600 Hz, is set at one half the baud rate (1200 bits per second). Both the MSK encoder 106 and the synchronization clock generator 104 may be implemented in a microprocessor 116.

The output of the summer 112 is applied to a bandpass filter 124 before application to an RF modulation scheme. As is known, the filter 124 will delay the various frequency components of a signal differently. For example, the 1200 Hz signal will be delayed differently than the 1800 Hz signal or the 600 Hz signal. The delay of each frequency component can be measured and thus be predetermined such that the relative delay between the MSK data signal 108e and the synchronization signal 102e will be compensated for by a programmable group delay, programmed into a code plug 122e.

A programmable delayed circuit 118, programmed by the code plug (122e) information for compensating the group delay of the transmit hardware, receives the combined modulated MSK data signal and synchronization signal 114 and provides the programmed relative delay to match the phased response of the transmitter bandpass filter 124. In this manner, the group delay is anticipated such that the bit boundaries of the relatively delayed synchronization signal 102e' will line up with the bit boundaries of the MSK data signal 108e.

Figure 4:
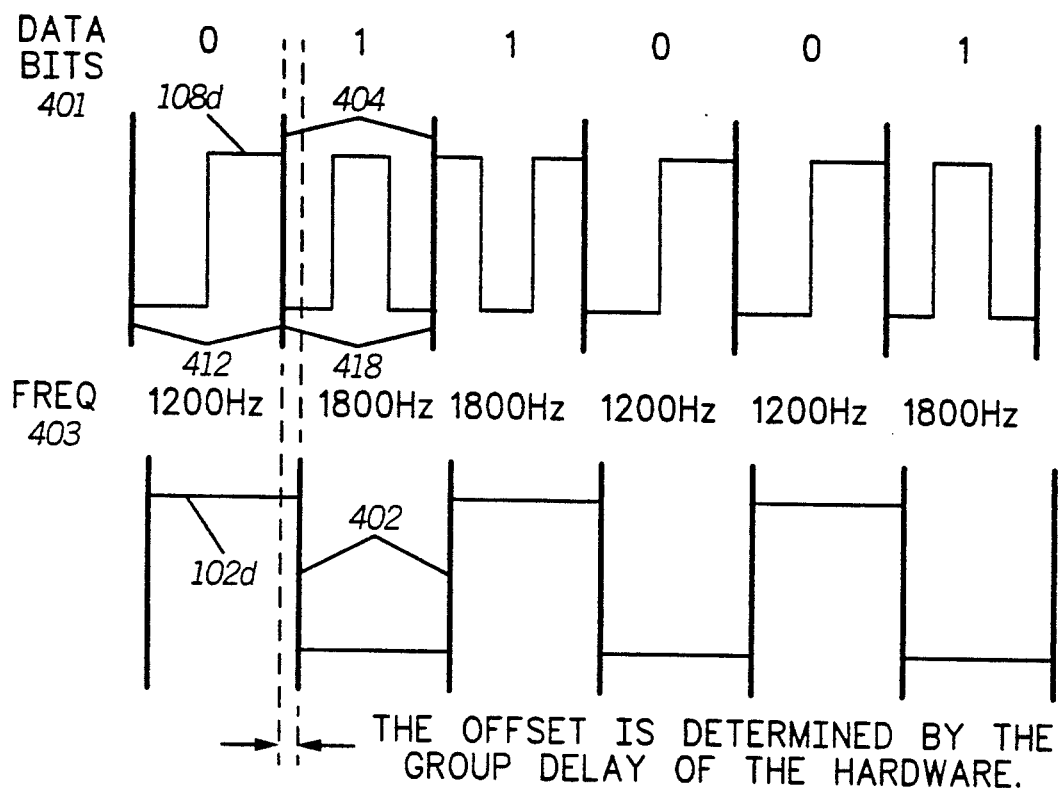
FIG. 4 shows the timeline waveforms, before group delay compensation, corresponding to the spectral density graphs of FIG. 3.

The MSK data signal 108e and the clock synchronization signal 102e are related to the waveforms shown in FIG. 4 in the sense that they would be sinewaves instead of square waves due to the absence of a limiter. However, the same type of group delay or offset would apply concerning the relative delay between the bit boundaries 402 and 404. The output of the bandpass filter 124 is applied for RF modulation as in a linear amplifier, the output of which is transmitted via an antenna.

Figure 5:
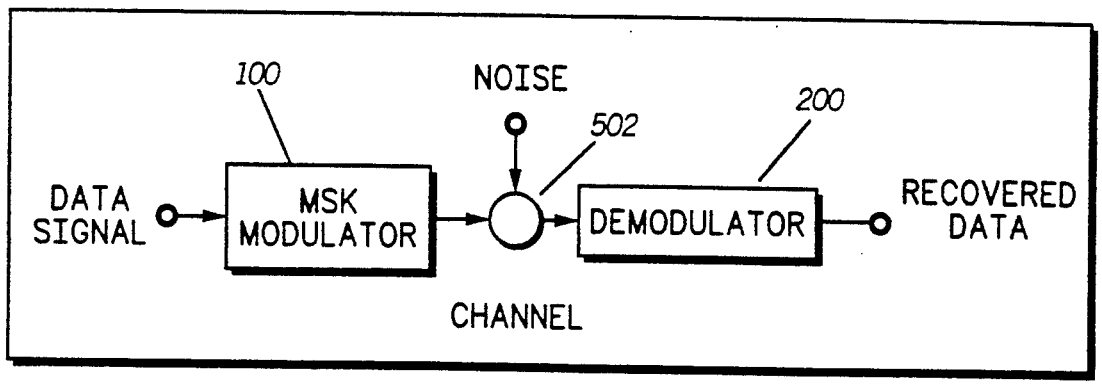
FIG. 5 illustrates a communications system employing the transmitter-encoder of FIG. 1 and the receiver-decoder of FIG. 2.

Referring to FIG. 5, in accordance with the present invention, the encoder-transmitter 100 of FIG. 1 MSK modulates a data signal for transmission over a communication channel 502 to a receiver-decoder 200. The communication channel 502 may be any conventional channel capable of carrying data signals, such as a radio channel and is generally subject to noise interference.

In FIG. 4, a typical MSK waveform, after limiting in the receiver, is shown indicating one full cycle of a 1200 Hz tone 412 and a one and a half cycle segment of the higher 1800 Hz tone 418. These are occurring at the bit rate, or symbol interval $f_b$ where $f_b$ is 1200 bits per second or 1200 baud. In general, the higher tone $$f_h = (M=1) \times f_b/4$$

and the lower tone $$f_l = (M-1) \times f_b/4 \text{ where } M \text{ is an integer.}$$

Figure 3:
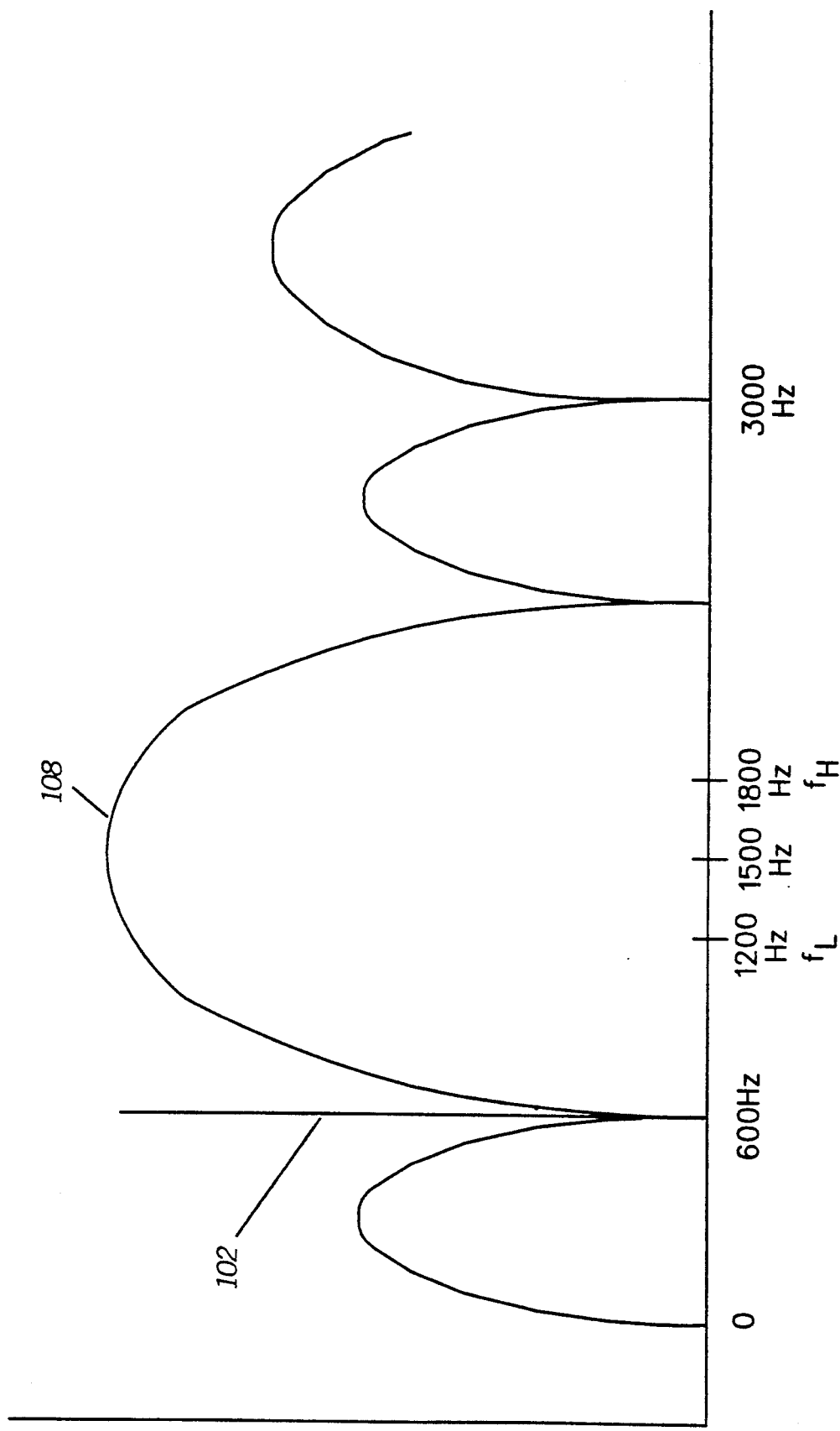
FIG. 3 is a power spectral density representation of a combined MSK data signal and synchronization signal in accordance with the present invention.

For odd integers that are five or greater, there is one null in the spectrum of the MSK signal of FIG. 3 occurring at one half the bit rate or 600 Hz.

Referring to FIG. 3, the transmitted signal includes both the MSK data signal 108 and the synchronization signal 102 where the clock synchronization signal 102 appears at one of the spectral nulls of the MSK data signal. Specifically, the null is occurring at one half the baud rate or 600 Hz, for the previous example.

Figure 2:
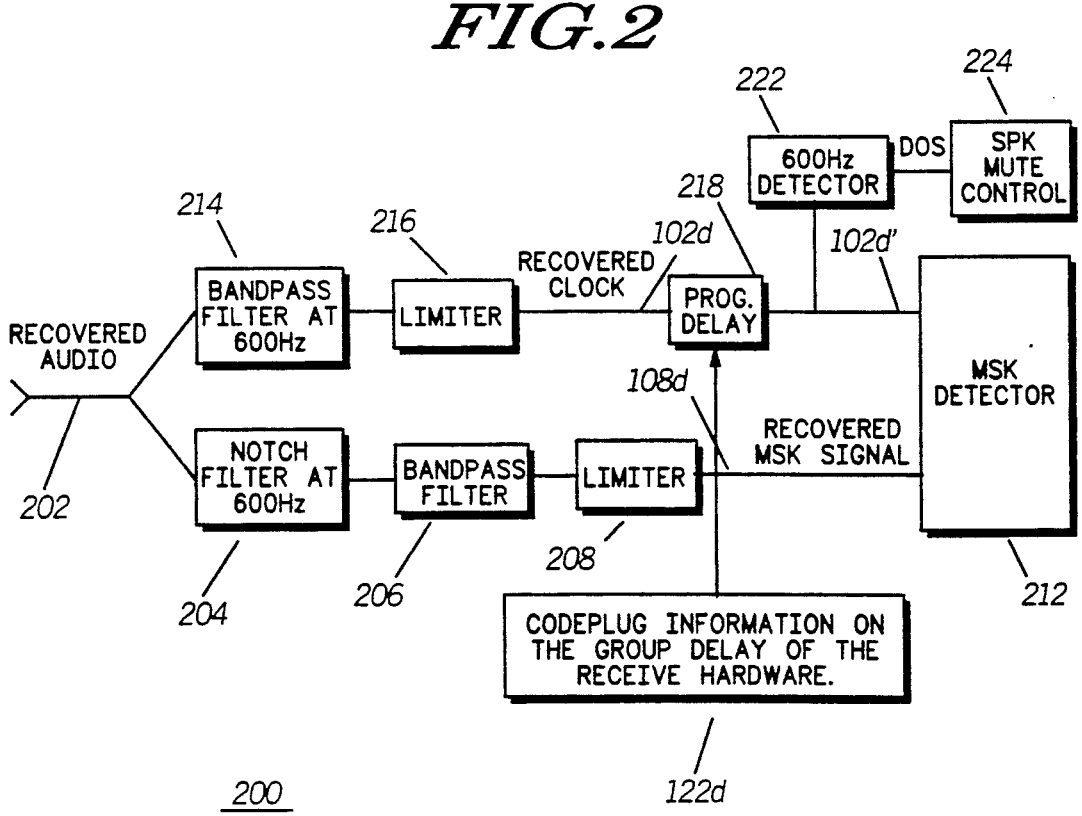
FIG. 2 is a block diagram of a receiver-decoder in accordance with the present invention.

At the receiving portion of the radio, the transmitted FM signal is received by a receiving antenna and an FM receiver which provides a recovered audio or MSK data signal 202. Referring to FIG. 2, there is illustrated a portion of a radio that may advantageously utilize the receiver-decoder 200 of FIG. 5 in accordance with the present invention for receiving MSK data signals and the synchronization signal from the remotely located base station or radio of FIG. 1. In a receiving portion of the radio, the FM combined MSK modulated signal and synchronization signal is received and recovered as a recovered audio signal 202.

The recovered audio signal or MSK data signal 202 is filtered by a notch filter 204, at half the baud rate or 600 Hz, to separate out the synchronization signal from the modulated MSK signal. To remove noise and interference, the separated out MSK data signal is filtered by a bandpass filter 206 before application to an amplitude limiter 208. The limiter 208 transforms the MSK data signal into a hard limited signal illustrated by a waveform 108d in FIG. 4.

The hard limited MSK data signal 108d is directly applied to a detector 212 which demodulates the MSK data signal without having to first recover or derive an internal clock signal from the preamble of the MSK data signal for use as its internal time base. Detector 212 may be implemented by a match filter, a microcomputer, or any other suitable detector.

Instead of having more complicated steps involved with synchronizing an internal time base, such as a phase-lock-loop, with the preamble word, these steps are eliminated by utilizing the transmitted synchronization signal directly. To accomplish this, the recovered audio signal 202 filtered by a bandpass filter 214 operating at 600 Hz in order to retrieve the synchronization signal. The bandpass filter at 600 Hz 214 eliminates as much of the channel noise as possible such that a higher signal to noise ratio can be achieved for better clock recovery of the transmitted synchronization signal.

The filtered signal synchronization signal is applied to another amplitude limiter 216, which transforms the filtered signal into a hard limited synchronization signal illustrated by a waveform 102d in FIG. 4. The recovered clock signal from the limiter 216 is applied to the detector 212 in accordance with a suitable demodulation algorithm (as a function of the synchronization signal) for proper data detection.

As previously described with reference to FIGS. 1 and 4, a programmable delay circuit 218 receives the recovered synchronization clock signal and provides a relative delay with respect to the recovered MSK signal 108d to match the phase response of the filters 204, 206, and 214. The relative delay or offset information is provided by a codeplug 122d.

The delayed recovered clock signal 102d is also applied to a 600 Hz detector 222 to directly enable a data operated squelch (DOS) circuit such as a speaker mute control circuit 224 without requiring the presence of a detected preamble word, as is done conventionally. The speaker mute control circuit 224 then mutes the audio or squelches a speaker whenever a data signal is present, as detected by the synchronization signal.

Referring to FIG. 4 a typical waveform timeline shows the incoming data signals being encoded according to a predetermined sequence of bits 401. The sequence of data bits 401 is shown to generate a sequence of low and high tones 403. In between these tones are shown bit edges or boundaries or symbol boundaries 404 by means of bold lines which indicate a bit transition from one tone to another. After the appropriate relative delay is applied, the synchronization signal will have bit boundaries or zero crossings 402 that are substantially aligned with the bit boundaries 404 of the MSK data signal.

Sampling points can be located very closely to these bit edges 404 for recovery of each respective MSK data bit 401. In one possible demodulation algorithm, the MSK detector 212 decodes the incoming MSK data signal directly by sampling the MSK data signal at an optimum point distanced away or referenced from the zero crossings 402 of the synchronization signal 102d'.

In operation, a synchronization signal is transmitted in the spectrum null at a frequency of one half the baud rate. This synchronization signal is adjusted to compensate for any group delayed distortion that is caused by the transmitter. At the receiver, the synchronization signal can be recovered using a bandpass filter. Then the receiver can further compensate for any group delayed distortion that exists in the receiver hardware. In this manner, the recovered synchronization signal is processed such that it would be accurate enough to approach the performance of an ideal demodulator in which the exact synchronization clock of the transmitted signal is known.

In summary, the clock recovery system of the present invention inserts a synchronization signal at the power spectral density null, which is at the frequency of $\frac{1}{2}$ the baud rate, of an MSK data signal, for later retrieval. The frequency at $\frac{1}{2}$ the baud rate thus substantially aligns each edge of the sync signal with each symbol boundary of the data signal. Without having part of the demodulator being taken up to generate an internal reference time base, the resultant demodulator of the present invention is easier to implement. If the demodulator is implemented as a microprocessor, a potential reduction in microprocessor loading with minimal hardware support can be achieved and a simplified method for detecting MSK data signals for data operated squelch results.

What is claimed is:

1. An MSK encoder-transmitter comprising:

MSK generating means for generating an MSK digitally modulated data signal having a bit rate ($f_b$), the MSK digitally modulated data signal so modulated with binary information as to inherently produce a spectral null ($f_n$) in its audio frequency spectrum at $\frac{1}{2}$ the bit rate, wherein $f_n = f_b/2$, the data signal containing binary data, having a bit edge occurring at the bit rate, each bit represented by one of two signaling tones, representing a mark or a space, with a plurality of successive bit edges occurring after each bit period ($T_b = 1/f_b$), whereby each of the bit edges occurs at the rate $f_b$;

means for generating a synchronization signal, in the audio spectrum, having a synchronization frequency ($f_s$) at $\frac{1}{2}$ the bit rate, the frequency at $\frac{1}{2}$ the bit rate corresponding to the spectral null of the MSK digitally modulated data signal, wherein $f_s = f_b/2$, the synchronization signal having two successive zero-crossings for each synchronization period ($T_s = 1/f_s = 2/f_b = 2T_b$), each of the zero-crossings occurring at every half period ($T_s/2 = 2T_b/2 = T_b$) of the synchronization period or every full period of the bit period Tb;

means for injecting in the MSK digitally modulated data signal the synchronization signal within the null to provide a composite data signal, composed of the sum of the MSK digitally modulated data signal and the synchronization signal, for use by receivers; and means for transmitting a radio frequency signal having a radio frequency carrier signal modulated with the composite data signal, wherein the synchronization frequency is not a function of the transmitted radio frequency signal.

2. An MSK decoder-receiver comprising:

MSK receiving means for receiving an MSK digitally modulated data signal at a bit rate ($f_b$), together with a synchronization signal, having a synchronization frequency ($f_s$) at a spectral null ($f_n$) of the data signal, at $\frac{1}{2}$ the bit rate, wherein $f_n = f_b/2$, wherein $f_s = f_b/2$, wherein $f_s = f_b/2$, the data signal containing binary data, occurring at the bit rate, each bit represented by one of two signaling tones, representing a mark or a space, with a plurality of successive bit edges occurring after each bit period ($T_b = 1/f_b$), whereby each of the bit edges occurs at the bit rate $f_b$, and the synchronization signal having two successive zero-crossings for each synchronization period ($T_s = 1/f_s = 2/f_b = 2T_b$), each of the zero-crossings occurring at every half period ($T_s/2 = 2T_b/2 = T_b$) of the synchronization period or every full period of the bit period Tb;

means for recovering the synchronization signal to detect a time occurrence of each zero-crossing of the synchronization signal at $T_s/2 = T_b$; and bit alignment means for demodulating the MSK digitally modulated data signal as a function of the synchronization signal by referencing the time occurrence of each zero-crossing of the synchronization signal at $T_s/2 = T_b$ as one of the successive bit edges of the data signal, whereby the bit between two successive bit edges, occurring during the bit period ($T_b$) can be sampled to determined whether the tone represents the mark or the space.

3. A clock recovery system for radio communication, the system comprising:

an MSK encoder-transmitter comprising:

MSK generating means for generating an MSK digitally modulated data signal having a bit rate ($f_b$) and an inherent spectral null ($f_n$) at $\frac{1}{2}$ the bit rate, wherein $f_n = f_b/2$, the data signal containing binary data, occurring at the bit rate ($f_b$), each bit represented by one of two signaling tones, having one of two possible values, with a plurality of successive bit edges, occurring after each bit period ($T_b = 1/f_b$);

means for generating a synchronization signal, in the audio spectrum, having a frequency at $\frac{1}{2}$ the bit rate, the frequency at $\frac{1}{2}$ the bit rate corresponding to the spectral null of the MSK digitally modulated data signal, wherein $f_s = f_b/2$, the synchronization signal having two successive zero-crossings for each synchronization period ($T_s=1/f_s=2/f_b=2T_b$), each of the zero-crossings occurring at every half period ($T_s/2=2T_b/2=T_b$) of the synchronization period or every full period of the bit period Tb; and means for transmitting the synchronization signal, at the spectral null of the data signal, together with the MSK digitally modulated data signal, at the bit rate, to compose a composite MSK digitally modulated data signal for modulating a radio frequency signal that is to be transmitted, wherein the frequency of the synchronization signal, $f_s=f_b/2$, is not a function of the transmitted radio frequency signal; and an MSK receiver comprising:

MSK receiving means for receiving the MSK digitally modulated data signal at the bit rate, together with the synchronization signal at the spectral null of the data signal, at ½ the bit rate;

means for recovering the synchronization signal to detect a time occurrence of each zero-crossing of the synchronization signal at $T_s/2=T_b$; and bit alignment means for demodulating the MSK digitally modulated data signal as a function of the synchronization signal by referencing the time occurrence of each zero-crossing of the synchronization signal at $T_s/2=T_b$ as one of the successive bit edges of the data signal, whereby the bit between two successive bit edges, occurring during the bit period ($T_b$) can be sampled to determine its value.

4. The clock recovery system of claim 3 wherein the means for transmitting includes transmitter filtering means.

5. The clock recovery system of claim 4 further comprises:

delaying means, in the MSK encoder-transmitter, for delaying the synchronization signal, generated by the MSK encoder-transmitter, with respect to the MSK digitally modulated data signal to compensate for the phase distortion of the transmitter filtering means.

6. The clock recovery system of claim 3 wherein the means for receiving includes receiver filtering means comprising:

a notch filter for filtering out the synchronization signal $f_s=f_b/2$ from the recovered data signal to provide the data bits; and a bandpass filter, operating around the synchronization frequency to retrieve the synchronization frequency to synchronize the data bits by aligning the zero-crossings of the synchronization signal with the bit edges of the data bits.

7. The clock recovery system of claim 6 further comprising:

delaying means for delaying the synchronization signal, recovered by the MSK receiver, with respect to the MSK digitally modulated data signal to compensate for the phase distortion of the receiver filtering means.

8. The clock recovery system of claim 3 wherein the means for demodulating comprises a matched filter.

9. The clock recovery system of claim 3 further comprising:

in the MSK receiver:

means for muting an audio speaker means in response to detecting the synchronization signal.

10. The clock recovery system of claim 3 wherein the means for transmitting comprises summing means for summing the synchronization signal and the MSK digitally modulated data signal.

* * * * *